(12) United States Patent
Bathich et al.

(10) Patent No.: US 10,728,945 B2
(45) Date of Patent: Jul. 28, 2020

(54) METHOD AND APPARATUS FOR TRANSMITTING SIGNALS WITH TRANSMITTING ACTIVITY DETECTION

(71) Applicants: MOLEX CVS DABENDORF GMBH, Dabendorf (DE); AUDI AG, Ingolstadt (DE)

(72) Inventors: Khaled Bathich, Berlin (DE); Helmut Nast, Berlin (DE); Raimo Jacobi, Berlin (DE); Juergen Spehl, Wettstetten (DE)

(73) Assignees: Molex CVS Dabendorf GmbH, Dabendorf (DE); Audi AG, Ingolstadt (DE)

( * ) Notice: Subject to any disclaimer, the term of this patent is extended or adjusted under 35 U.S.C. 154(b) by 0 days.

(21) Appl. No.: 15/737,404

(22) PCT Filed: Jun. 14, 2016

(86) PCT No.: PCT/EP2016/063575
§ 371 (c)(1),
(2) Date: Dec. 18, 2017

(87) PCT Pub. No.: WO2016/202773
PCT Pub. Date: Dec. 22, 2016

(65) Prior Publication Data
US 2018/0167991 A1 Jun. 14, 2018

(30) Foreign Application Priority Data
Jun. 18, 2015 (DE) .......................... 10 2015 211 278

(51) Int. Cl.
*H04W 76/15* (2018.01)
*H04B 1/00* (2006.01)
(Continued)

(52) U.S. Cl.
CPC ............ *H04W 76/15* (2018.02); *H04B 1/006* (2013.01); *H04B 1/0064* (2013.01);
(Continued)

(58) Field of Classification Search
CPC ............ H04W 76/15; H04W 52/0245; H04W 72/085; H04B 1/006; H04B 1/0064;
(Continued)

(56) References Cited

U.S. PATENT DOCUMENTS

| 4,267,599 A * | 5/1981 | Vissers ..................... H03J 3/14 |
| | | 324/646 |
| 8,150,454 B2 | 4/2012 | Sanders |

(Continued)

FOREIGN PATENT DOCUMENTS

| CN | 102273011 A | 12/2011 |
| CN | 102460983 A | 5/2012 |

(Continued)

*Primary Examiner* — Christopher R Crompton
(74) *Attorney, Agent, or Firm* — Laurence A. Greenberg; Werner H. Stemer; Ralph E. Locher

(57) ABSTRACT

Signals are transmitted from and to a plurality of terminals. The apparatus has a plurality of signal connections and at least two antenna connections. One signal connection is a main connection or a secondary connection. At least one main connection for each terminal can be connected. The number of signal connections is greater than the number of antenna connections. At least one linking element allows each main connection to be electrically linked to each antenna connection. A device for detecting transmitting activity detects a transmitting main connection based on a signal property of a signal, wherein the signal is present on a signal link section which is linked to the main connection. Signaling links between the signal connections and the antenna connections can be established on the basis of the (Continued)

detected transmitting main connections and the number of signal connections assigned to a terminal.

18 Claims, 1 Drawing Sheet

(51) Int. Cl.
*H04B 7/06* (2006.01)
*H04W 52/02* (2009.01)
*H04W 72/08* (2009.01)
*H04B 1/18* (2006.01)
*H04B 1/04* (2006.01)

(52) U.S. Cl.
CPC ...... *H04B 7/0613* (2013.01); *H04W 52/0245* (2013.01); *H04W 72/085* (2013.01); *H04B 1/0458* (2013.01); *H04B 1/18* (2013.01); *H04B 7/0602* (2013.01); *Y02D 70/00* (2018.01); *Y02D 70/1242* (2018.01); *Y02D 70/1262* (2018.01); *Y02D 70/40* (2018.01); *Y02D 70/444* (2018.01)

(58) Field of Classification Search
CPC ...... H04B 7/0613; H04B 1/0458; H04B 1/18; H04B 7/0602
USPC .......................................................... 370/311
See application file for complete search history.

(56) References Cited

U.S. PATENT DOCUMENTS

| | | | |
|---|---|---|---|
| 2009/0061852 A1 | 3/2009 | Feher | |
| 2010/0120466 A1* | 5/2010 | Li | H04B 1/006 455/552.1 |
| 2011/0250914 A1 | 10/2011 | Arlotta | |
| 2012/0170519 A1 | 7/2012 | Nast et al. | |
| 2013/0040671 A1 | 2/2013 | Zawaideh et al. | |
| 2014/0185707 A1 | 7/2014 | Bollmann | |
| 2014/0235260 A1 | 8/2014 | Zawaideh et al. | |
| 2014/0361738 A1* | 12/2014 | Lee | H02J 5/005 320/108 |
| 2015/0200691 A1 | 7/2015 | Ehrentraut | |
| 2015/0303569 A1* | 10/2015 | Jacobs | H01Q 1/28 343/858 |
| 2016/0195614 A1* | 7/2016 | Tabrikian | G01S 13/931 |
| 2016/0218426 A1* | 7/2016 | Kelly | H01Q 3/24 |
| 2016/0226298 A1* | 8/2016 | Shimokawa | H02J 50/40 |
| 2017/0251489 A1* | 8/2017 | Caretti | H04W 72/1273 |
| 2017/0365908 A1* | 12/2017 | Hughes | H01Q 1/1271 |

FOREIGN PATENT DOCUMENTS

| | | |
|---|---|---|
| CN | 104508984 A | 4/2015 |
| CN | 105227220 A | 1/2016 |
| DE | 102009027358 A1 | 1/2011 |
| DE | 102012014548 B3 | 5/2014 |
| WO | 2007073406 A1 | 6/2007 |

* cited by examiner

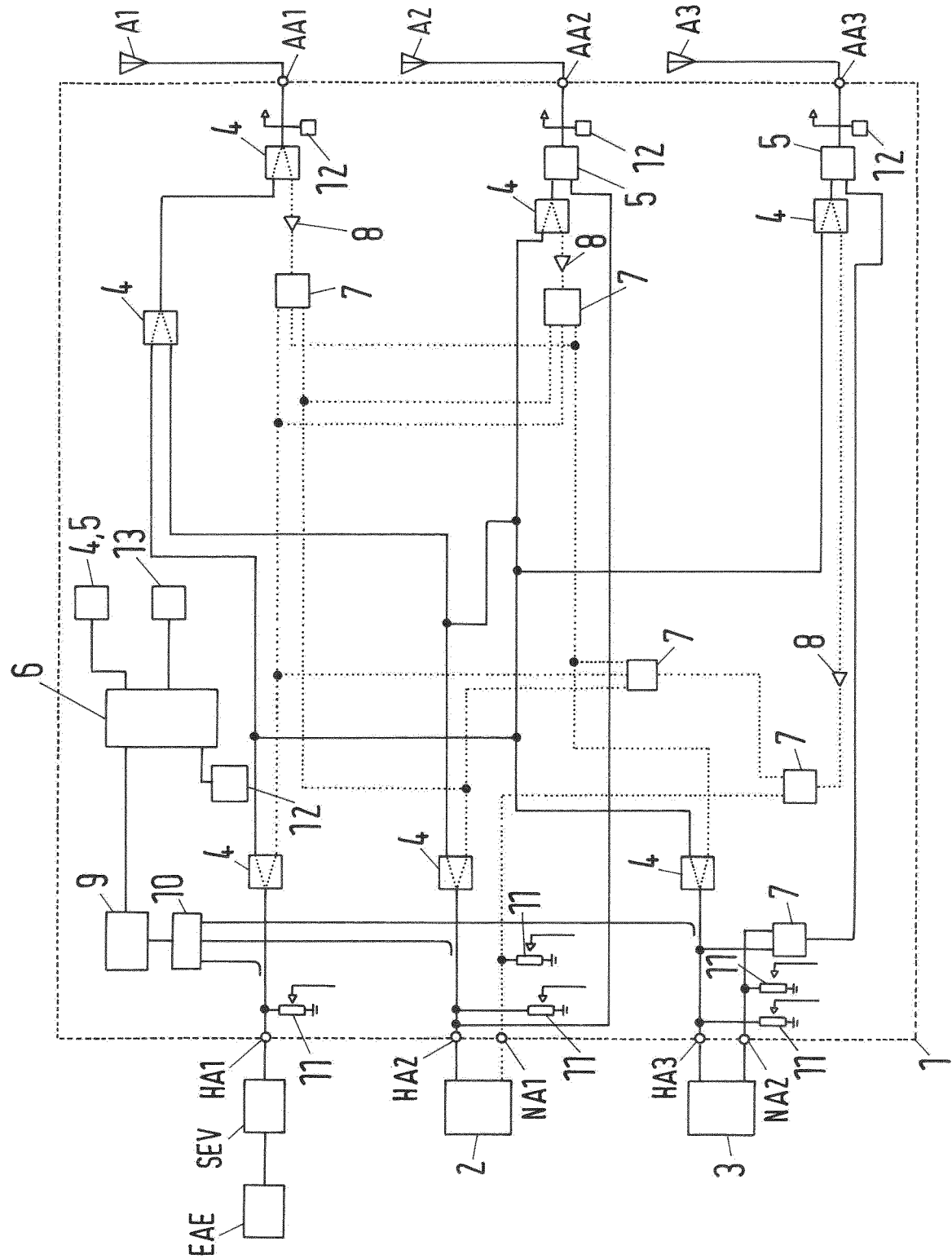

METHOD AND APPARATUS FOR TRANSMITTING SIGNALS WITH TRANSMITTING ACTIVITY DETECTION

BACKGROUND OF THE INVENTION

Field of the Invention

The invention relates to an apparatus and a method for transmitting signals, in particular between a plurality of signal connections of a plurality of terminals and a multiplicity of antennas.

A wide variety of terminal devices exist, which require a wireless connection for transmitting data from and to the terminal during their operation. Such terminals can be, in particular, portable terminal devices, such as mobile phones and tablet PCs, but also on a computer and similar terminals. Such terminal devices also include control devices of systems that are not necessarily intended for direct operation by a user.

For example, in motor vehicles a wide variety of terminals are used for transmitting data over a wireless connection for performing desired functions. Such control equipment can be, e.g., control units of a vehicle's infotainment system. Of course, other vehicle systems, for example, assistance or emergency systems of the vehicle can also comprise such control devices. Thus, for example, for the reliable execution of a so-called eCall feature a wireless connection of a corresponding control device to an external base station is necessary.

Furthermore, it is known that portable terminal devices, especially mobile phones, are operated in vehicles. In order to establish a telephone connection, as well as for establishing a data connection, these also require a wireless connection.

Wireless connections of such terminals are usually established via at least one antenna in the vehicle. Existing solutions specify at least one antenna to be provided for each terminal, via which the corresponding wireless connection is established. Such a configuration, however, has high space requirements and requires a high degree of assembly effort. Thus in the case of vehicles, particularly motor vehicles, due to the limited space it is difficult to provide installation space for a corresponding antenna for each terminal.

DE 10 2012 014 548 B3 discloses a mobile wireless device for a motor vehicle, having a first and a second mobile wireless module. Furthermore, a first antenna and a second antenna are provided for transmitting mobile wireless signals. In addition, a switching device is provided, which is linked to the antennas and a respective signal connection of the mobile wireless modules and which is configured to switch between a first switching state and a second switching state based on a switching signal. The document discloses that the mobile wireless device comprises more signal connections than antennas. However, in this case the switching signal is generated by a mobile wireless module, which therefore necessarily forms part of the mobile wireless device. Therefore, the proposed switching device can only be used when at least one mobile wireless module, which can produce a corresponding switching signal, is present.

This presents the technical problem of creating an apparatus and a method for transmitting signals from and to a multiplicity of terminal devices, which enable a reliable signal transmission, while minimizing installation space requirements and expanding a field of application of the apparatus and the method.

SUMMARY OF THE INVENTION

The solution of the technical problem is achieved by the subject matter having the features as claimed. Further advantageous configurations of the invention are derived from the dependent claims.

An essential idea of the invention is to establish a dedicated signalling link between signal connections and from antenna connections via a switching device based on an operating scenario, wherein the number of signal connections is greater than the number of antenna connections and wherein an operating scenario is selected based on a detected transmission activity of terminals, to which the signal connections are assigned.

An apparatus for signal transmission from and to a multiplicity of terminals is proposed. The apparatus may be used, in particular, for transmission of high-frequency signals. The apparatus can therefore be used for signal transmission to and from at least two terminals, preferably from and to three or more terminals. The apparatus can enable a signal transmission in accordance with one or more desired standards, in particular an LTE, a UMTS and a GSM standard. Different terminals, each of which transmit signals in accordance with one of these standards, can therefore be connected to the apparatus. The apparatus can preferably, but not exclusively, be applied in vehicles, in particular motor vehicles.

A terminal device can be a mobile telephone, for example. The mobile telephone can be connected to the apparatus, for example, via a transmit/receive amplifier device, which can also be designated as a compenser. A terminal can also be a control unit. The control unit may be, in particular, a control unit of a vehicle, in particular a motor vehicle. In particular, the control unit can be a control unit of an infotainment system or other vehicle system. The control unit may, for example, execute a so-called eCall function.

The apparatus has a number of signal connections and a number of antenna connections. The apparatus in this case has a minimum of two antenna connections. A signal connection of the apparatus can be connected to a terminal, for example, via a corresponding signal connection of the terminal device. The connection can be made, for example, galvanically. Other types of connection are also conceivable, however. An antenna connection can be connected to an antenna or an equivalently functioning element, in particular galvanically. The signal connection to which a terminal can be connected can be designated as the signal connection assigned to the terminal.

A signal connection is then a primary connection or a secondary connection. The primary connection or secondary connection can designate the type of signal connection. For the purposes of this invention, the primary connection can refer to a signal connection, which in a normal operating state must be mandatorily linked to an antenna connection or antenna, in order to ensure a reliable and uninterrupted data transfer from and to a terminal connected to this primary connection. In other words, in the normal operating state a terminal without a link to a primary connection cannot establish a network connection. In the normal operating state therefore, both the terminals and the antennas are connected to the apparatus. The reliable and uninterrupted data transmission must therefore be guaranteed, in particular for a terminal in the active transmission mode, wherein this terminal sends and receives signals in the active transmission mode. Thus, in particular in the active transmission mode, a signalling link, e.g. a galvanic connection, is provided from the terminal to an antenna, wherein this link is used for signal transmission both for sending as well as for signal transmission for receiving.

A secondary connection can designate a signal connection, which in the normal operating state does not necessarily need to be linked to an antenna connection or an antenna for a reliable and uninterrupted data transmission. A secondary connection can enable, for example, a multipath reception of signals, which allows an increased data rate for the reception of signals. Furthermore, a secondary connection can be a so-called backup connection, which enables data transmission from and to the terminal in a fault operating condition. This will be explained in more detail below.

A terminal can have a corresponding primary connection, wherein a primary connection of the terminal is linked to a primary connection of the apparatus. Furthermore, a terminal can have a corresponding secondary connection, wherein the secondary connection of the terminal is linked to a secondary connection of the apparatus.

The normal operating state can designate an operational state, in which a signal transmission is possible via all primary connections and all antenna connections. In a different fault operating state, for example, an antenna that is linked to an antenna connection and/or the primary connection of the terminal cannot be functional or only partially functional.

In addition, at least one primary connection is assigned to a terminal. This means that the apparatus has at least one primary connection for each connectable terminal. If, for example, the terminal has only one corresponding primary connection, then exactly one primary connection of the apparatus can be assigned to the terminal. This primary connection is linked to the terminal-side primary connection. Of course, it is also conceivable that a terminal has a plurality of primary connections, wherein one primary connection of the apparatus can be assigned to each of these terminal-side primary connections. It is also conceivable that, in addition to the at least one primary connection, a terminal also has a secondary connection, wherein this terminal-side secondary connection is then assigned exactly one secondary connection of the apparatus, which is connected to the secondary connection of the terminal device. Therefore, in addition to at least one primary connection, at least one secondary connection can also be assigned to a terminal.

Furthermore, the number of signal connections is greater than the number of antenna connections. This makes it possible to reduce the number of antennas required. However, the number of primary connections of the apparatus can be equal to or greater than the number of connectable terminals.

The apparatus further comprises at least one linking element for establishing at least one, preferably a plurality, of distinct signalling link(s). A signalling connection can also be designated as a signal branch. Hereafter, the term "link" can designate such a "signalling link". For example, the term "connect" or "link" can designate a galvanic connection. A linking element can be, in particular, a switch element or a changeover switch element. A changeover switch element may be, in particular, designed as a SPDT (single-pole double throw) element. The apparatus preferably comprises a plurality of changeover switch elements.

A linking element can also be a splitter element. The apparatus also preferably comprises a plurality of splitter elements.

In addition, each primary connection can be linked to each antenna connection via a signal connection, thus a signal branch. This means that each primary connection can be connected to each antenna connection via one of the signal connections that can be established. Thus, galvanic connection sections and the connection elements are arranged in such a way that each primary connection is galvanically connectable to each antenna connection via a signal link that can be established by means of the connection element. A galvanic connection can either be provided by means of a micro-strip line or else comprise a micro-strip line. A signal link section can therefore also be provided by a micro-strip line or a section thereof, or else comprise a micro-strip line or a section thereof.

The apparatus can comprise a control device for controlling an operation of the connection elements. The control device may in particular set switching states of the switching elements.

The arrangement of galvanic signal link sections and of the connecting elements and, if applicable, splitter elements can also be designated as a switching device, which can be part of the apparatus. Using this switching device therefore, every primary connection can be connected to every antenna connection. In addition, every secondary connection can be connected, in particular galvanically connected, to at least one selected antenna connection or to all antenna connections. The number of antenna connections can be equal to the number of primary connections.

Via the connection elements and, if applicable, any existing splitter elements, different transmit/receive branches and different receiving branches can be established. A send/receive branch in this context designates a signalling link, which can be used to send and receive signals, for example in a frequency- or time-based duplexing mode. Thus, the transmit/receive branch is used for transmitting signals from a signal connection to an antenna connection and from an antenna connection to a signal connection. A receive branch is used exclusively for transmitting signals from an antenna connection to a signal connection.

The apparatus can additionally comprise at least one, but preferably a plurality of, amplifier device(s). In particular, an amplifier device can be arranged in such a way that it is part of a receiving signal branch which can be established. Therefore, the amplifier device can be used in particular for amplifying received signals. Alternatively or in addition, it is also possible however to arrange an amplifier device in such a way that this amplifier device is part of a sending signal branch which can be established and thus can be used for amplifying transmitted signals.

Antennas which are connected to the antenna connections can also form part of the proposed apparatus. It is also possible for terminals connected to the signal connections to form part of the proposed apparatus.

According to the invention, the apparatus comprises at least one device for detecting transmitting activity. By means of the device for detecting transmitting activity, an actively transmitting primary connection can be detected on the basis of a signal characteristic of a signal, wherein the signal is present on a signal link section, which is linked to the corresponding primary connection. The signal which is present can be a signal which is transmitted via the signal link section, in particular a transmission signal. An actively transmitting primary connection can be a primary connection via which a terminal connected to this primary connection transmits a signal.

The signal property is preferably a signal level of the signal. An actively transmitting primary connection can be detected, for example, if a signal level of the signal is greater than a predetermined threshold value.

The device for detecting transmitting activity can comprise at least one device for sensing the signal property and at least one evaluation device. The device for sensing the signal property can carry out the acquisition for each signal link section of a number of signal link sections, wherein each of these signal link sections is galvanically connected to one each of the primary connections. Of course, it is also conceivable that the device for detecting transmitting activity comprises a plurality of devices for sensing the signal property, each of which enables the acquisition for one or more of these signal link sections. Of course, the device for detecting transmitting activity can also comprise a plurality of evaluation devices.

The or a evaluation device can either be provided by the previously described control device, or form part of it. The control device, the evaluation device or a corresponding control and evaluation device can be provided, for example, by a microcontroller.

The device for detecting transmitting activity is a different device from a terminal. In particular, the device for detecting transmitting activity and a terminal device are designed as physically separate devices. However, the device for detecting transmitting activity and a terminal can be linked via signalling means.

Further, signalling links, or signal branches, of the signal connections can be established with the antenna connections on the basis of the actively transmitting primary connections that have been detected. Furthermore, in particular additionally, the signalling links can be established on the basis of the number of the signal connections assigned to a terminal. Furthermore, in particular additionally, the signalling links can be established on the basis of the type of the signal connections assigned to a terminal. Furthermore, the signalling links, as described in more detail below, can be established on the basis of the functionality of the antenna connections. In other words, for each signal connection, either no or one signalling link of the signal connection can be established with at least one of the antenna connections.

Thus, the signalling links can be established based on an operating scenario, depending on the number and/or depending on the type of the signal connections. This may mean that the signal connections are established depending on the operating scenario, and depending on a signal connection configuration and assignment. In particular, the operating scenario is designated a transmission operating scenario. In particular, the signalling links can be established in such a way that each primary connection of the apparatus is connected to an antenna connection. The signal links can additionally be established in such a way that either one selected or all secondary connections is/are connected to an antenna connection. The corresponding signalling links can be established, e.g. by means of the control device, which activates the at least one connecting element according to the signalling links to be established, in particular sets the corresponding switching states of changeover switching elements.

Regardless of the number of actively transmitting primary connections, i.e. for any number of actively transmitting primary connections, any primary connection can be connected to an antenna connection via a signalling link. The proposed apparatus is thus used in an advantageous way for connecting a plurality of terminals to antennas, wherein different signalling links between terminals and antennas can be set, wherein these different links can also be set independently of the design of a connected terminal. The apparatus enables the desired links to be set depending on the operating scenario, wherein the operating scenario is determined by the apparatus itself. In particular, no terminal for generating control signals for establishing the links is necessary. The proposed apparatus can thus be easily retrofitted in existing systems, in particular in motor vehicles. In other words, there is a wide range of applications of the proposed apparatus.

In a further embodiment, the connection from the primary terminals and the secondary connections to the antenna connections is made according to an assignment rule which is known in advance. A plurality of such assignment rules can exist. An assignment rule can be specific to a number of the signal connections, the types of the given signal connections (i.e. primary or secondary connection), the assignment of signal connection types to the terminals and/or a number of functional antenna connections. A functional antenna connection refers to a connection to which an antenna that is functioning properly is connected. The assignment rule can therefore be apparatus-specific. The assignment rule can also be terminal-specific and/or antenna-specific. For example, an assignment rule can exist for an apparatus with three primary connections, two secondary connections and three functional antenna connections, wherein one primary connection is assigned to one terminal and one primary and one secondary connection are both assigned to two terminals.

An assignment rule also contains information about the transmitting activity-dependent signalling links from the signal connections to the antenna connections. These connections can also be referred to as transmitting activity-dependent operating scenarios of the apparatus.

The previously known assignment rule can be stored, for example, in the form of assignment tables. These can also be referred to as configuration tables. It is possible that the previously described control device has access to the information of the assignment rule. This advantageously enables a simple selection and setting of the corresponding signalling link.

In other words, for a given configuration of the proposed apparatus, the assignment rule specifies the signal links to be established from the signal connections to the antenna connections for different transmission operating scenarios. A transmission operating scenario is then specified by the number of actively transmitting primary connections and, if applicable, the terminal assigned to the particular actively transmitting primary connection.

The assignment rule can also be advantageously created on a manufacturer-specific basis. This means that each manufacturer, in particular automobile manufacturers, can create for the vehicles or vehicle types produced an assignment rule, which is different to an assignment rule of other manufacturers.

The assignment rule can be predefined and, for example, configured during the production of the apparatus. Furthermore, the assignment rule can be variable, for example, by a user-specific input via a corresponding input device.

In a further embodiment, in the event that no actively transmitting signal connection is detected, all primary connections are linked to one of the antenna connections and at least one secondary connection to one of the remaining antenna connections. These signal connections are thus established in an operating scenario in which no actively transmitting primary connection is detected. Furthermore, different secondary connections can each be connected to one of the remaining antenna connections.

This means that every terminal can receive signals via its primary connection. In addition, all primary connections are connected to the same antenna connection. Secondary connections can be connected to the antenna connections still available, for example to the same one or each to different antenna connections. This results advantageously in that a desired antenna, e.g. the antenna with the lowest directivity or the antennas with the highest receiving power, can be used as the receiving antenna for all terminals in this operating scenario.

In a further embodiment, in the event that exactly one actively transmitting primary connection is detected, this actively transmitting primary connection is linked to one of the antenna connections. Also, the remaining primary connections are linked to one of the remaining antenna connections, in particular to the same remaining antenna connection. Also, at least one secondary connection is linked to another of the remaining antenna connections. These signal connections are thus established in an operating scenario in which exactly one actively transmitting signal connection is detected. In an advantageous way this ensures that exactly one antenna is provided to a transmitting terminal, while a common antenna is provided to the terminals that are only receiving. In addition, antennas that are still available can be assigned to the secondary connections, for example, to facilitate the multipath reception previously described.

In a further embodiment, in the event that more than one actively transmitting primary connection is detected, but not all primary connections are actively transmitting, the actively transmitting primary connections are each connected to antenna connections that differ from each other. Also, the remaining primary connections are linked to one of the remaining antenna connections, in particular the same remaining antenna connection. These signal connections are therefore established in an operating scenario in which more than one actively transmitting primary connection is detected, but not all primary connections are actively transmitting. This also advantageously provides one antenna to each actively transmitting terminal, while at the same time a reception is guaranteed via a remaining antenna for the terminals that are not actively transmitting.

In this operating scenario, it is possible for at least one secondary connection to be linked to another of the remaining antenna connections, if this antenna connection is not yet connected to a primary connection. The linking of the secondary connection to another of the remaining antenna connections is not possible, for example, for a secondary connection of a terminal which is not actively transmitting, if a primary and this secondary connection is assigned to this non-actively-transmitting terminal, since in this case there is no free antenna available for the secondary connection of the non-actively-transmitting terminal.

In a further embodiment a secondary connection, which is assigned to the same terminal as one of the actively transmitting primary connections, is linked to the remaining antenna connection. This allows, for example, a multipath reception to be provided in an advantageous way.

In a further embodiment, in the event that all primary connections are detected as being actively transmitting, the actively transmitting primary connections are each connected to antenna connections that differ from each other. These signal connections are thus established in an operating scenario in which all primary connections are detected as actively transmitting. In this case, no secondary connection can be linked to an antenna connection.

This advantageously results in that, even in the case that all terminals are actively transmitting, an antenna can be provided to each of them.

In a further embodiment, the signal connection of actively transmitting primary connections to the antenna connections is established based on at least one antenna property. The antenna property may be, in particular, a directivity. In this case a level of the directivity can represent a degree of shielding of the respective antenna, for example by other components of the vehicle. It is thus possible that in the case of exactly one actively transmitting primary connection, this is linked to the antenna connection whose antenna has the lowest directivity. If a plurality of primary connections are actively transmitting, then these can be connected to the antenna connections whose directivity values are less than the directivity values of the remaining antenna connections. Also, a certain primary connection, if it is actively transmitting, can always be connected to an antenna with a selected directivity, for example, the lowest directivity.

An assignment specifying which antenna connection is assigned to which actively transmitting primary connection in an operating scenario can be included in the assignment rule explained above.

Advantageously, this results in the actively transmitting terminals each being connected to the best antennas.

In a further embodiment, the apparatus comprises at least one resistor. The apparatus preferably comprises a plurality of resistors, in particular one resistor per signal connection. The resistor may be implemented, in particular, as a high-frequency resistor. The resistor is galvanically connected to a signal connection, wherein the resistor simulates an antenna characteristic resistance. The fact that the resistor simulates an antenna characteristic resistance can mean that the resistor has the same value as an antenna which is to be connected to the corresponding signal connection of the terminal. The result thereby advantageously achieved is that terminals to be connected to the apparatus detect an output resistance of the same value as the antenna characteristic resistance, and thus assume the presence of an antenna. The resistor may, in particular, be an adjustable resistor. This can mean that a resistance value can be adjusted, in particular in a predetermined value range. The setting of the resistor can be controlled by the control device described earlier.

It is possible for the resistor to be adjusted based on a detected functionality of an antenna which is described below. If an antenna connected to the apparatus is not functional or not functioning as expected, then the resistance can be set in such a way that a terminal detects a value for the output resistance, which lies in a non-predefined value range of a resistance of a functioning antenna. As a result, a non-functional antenna is simulated for the terminal. In this case, the terminal can execute an error routine.

In a further embodiment, the apparatus comprises at least one device for testing a functionality of an antenna connected to an antenna connection. The device may, in particular, be a device for determining or measuring an output resistance of an antenna connection.

This means it can be detected in an advantageous way whether an antenna connected to one antenna connection is either not functioning or not functioning as expected. This information can then be transmitted to a higher-level system. For example, this information can be transmitted to a communication system of the vehicle, in which the apparatus is arranged. The communication system may, in particular, be a bus system. The apparatus can have a corresponding communication interface for this.

For example, an error message can be generated and displayed to a user of the system. Also, the information, as previously explained, can be used for adjusting a resistance of the apparatus.

In a further embodiment, the assignment rule can be selected based on the number of functional antennas. If, for example, it is detected that one or a plurality of antennas are non-functional, then an assignment rule which is different from the currently selected assignment rule can be selected, the information of which is then used in the respective operating scenarios for establishing the signal connections to the remaining functional antennas.

This optimizes the functional capability in the event of a fault in an advantageous way.

In a further embodiment, a secondary connection is a multipath receiving connection. Alternatively, a secondary connection is a backup connection. A multi-path receiving connection is used to provide an additional reception branch for a terminal and thus bring about an increase in the transmission rate of the corresponding signal transmission. A backup connection can replace a primary connection assigned to the same terminal, if signal transmission is no longer possible via this primary connection. This means that the signal transmission for which the primary connection is used takes place over the backup connection.

In a further embodiment, in the event of insufficient power supply to the apparatus, at least one signal connection is linked to an antenna connection. This signal connection may, in particular, be a backup connection. The signal connection in this case can be linked to the antenna connection via at least one connection element, in particular a changeover switching element, which in a state of insufficient energy supply, for example, in a de-energized state, connects the antenna connection to the signal connection. If there is an adequate energy supply, the signal connection between the signal connection and the antenna connection is interrupted at least by this connecting element. Such a connection element may, in particular, be an RF relay. An RF relay can be a connecting element or a switching element, which even in a state of insufficient energy supply, e.g. in the de-energized state, can pass through transmit and receive signals.

As a result, in the event of a state of insufficient energy supply, for example, in the case of an accident or crash of the vehicle, a signal transmission is advantageously still possible via one signal connection. Such a signal connection can be connected, in particular, to a terminal which performs an eCall function.

A method for signal transmission from and to a multiplicity of terminals is also proposed. The method can be implemented by means of an apparatus according to one of the embodiments described in this invention. In particular, an actively transmitting primary connection is detected on the basis of a signal characteristic of a signal, wherein the signal is present on a signal link section (signal branch section) which is galvanically connected to the primary connection. This can be effected in particular using the device for detecting transmitting activity previously described. Further, signalling links of the signal connections are established with the antenna connections on the basis of the actively transmitting primary connections detected. Furthermore, in particular additionally, the signalling links from the signal connections to the antenna connections can be established on the basis of the number of signal connections assigned to a terminal.

In addition, the linking of the primary terminals and the secondary connections to the antenna connections can be effected based on an assignment rule which is known in advance. In particular, a signal connection can be established according to one of the operating scenarios outlined above.

In a further embodiment, the signalling links are established independently of apparatus-external control signals. Apparatus-external control signals can be signals for controlling the operation of a connecting element, in particular a changeover switch element, which have not been generated by a component of the apparatus. An apparatus-external component can, in particular, be a device connected to the apparatus. The fact that the signalling links are established independently of apparatus-external control signals can mean, for example, that the connections are established based on an output signal of at least one device for detecting transmitting activity of the apparatus, wherein a device for detecting transmitting activity can detect an actively transmitting primary connection on the basis of a signal characteristic of a signal, wherein the signal is present on a signal link section, which is linked to the primary connection. The output signal can represent whether a primary connection is an actively transmitting primary connection or not.

The invention will now be described in further detail based on an exemplary embodiment. The only FIGURE shows a schematic circuit diagram of an apparatus according to the invention with connected terminals and antennas.

In the following, identical reference numerals denote elements with identical or similar technical features.

BRIEF DESCRIPTION OF THE SEVERAL VIEWS OF THE DRAWING

The FIGURE shows a schematic circuit diagram of an apparatus according to the invention.

DESCRIPTION OF THE INVENTION

The FIGURE shows a schematic circuit diagram of an apparatus 1 according to the invention. The apparatus 1 has a first primary connection HA1, a second primary connection HA2 and a third primary connection HA3. In addition, the apparatus 1 has a first secondary connection NA1 and a second secondary connection NA2.

A transmitter/receiver amplification device SEV for cellular phone signals is connected to the first primary connection HA1. This is connected in turn to a terminal connection device EAE. The terminal connection device EAE can also be designated as a phone box or so-called cradle. Via the terminal connection device, a first terminal, not shown, in particular a cellular telephone, can be connected to the first primary connection HA1.

To the second primary connection HA2 and the first secondary connection NA1, a second terminal 2 is connected, which can be, for example, a control unit of an infotainment system of the vehicle. The second terminal 2 has a corresponding primary connection and a corresponding secondary connection for this purpose. To the third primary connection HA3 and the second secondary connection NA2 a third terminal 3 is connected, which also has two corresponding signal connections.

The terminals 2, 3 can be galvanically connected to the respective signal connections HA1, . . . NA2. The primary connections HA1, . . . HA3 and the secondary connections and NA1, NA2 in this case form signal connections of the apparatus 1. The primary connections HA1, . . . HA3 are used for signal transmission in a transmission operation of the terminals 2, 3. Also, these primary connections HA1, . . . HA3 can be used for a receiving operation.

The first secondary connection NA1 can be implemented as a so-called receiving connection. This is used for a reception of signals for a multipath reception operation of the second terminal 2. The second secondary connection NA2 can be used as a so-called backup connection. This is used for a signal transmission of the third terminal 3 in the transmit and receive operating mode in a fault condition.

The apparatus 1 also has a first antenna connection AA1, a second antenna connection AA2 and a third antenna connection AA3. A first antenna A1 is connected to the first antenna connection AA1. A second antenna A2 and a third antenna A3 are connected to the second and third antenna connection AA2, AA3 respectively.

The apparatus 1 also comprises changeover switching elements 4, which can be configured, for example, as single-pole double throw elements. The apparatus 1 further comprises additional changeover switching elements 5, which can be configured, for example, as RF relay elements. The changeover switching elements 4, 5 can occupy different switching states. In particular, the changeover switching elements 4, 5 can connect one input connection to one of a plurality of output connections. The switching states of the changeover switching elements 4, 5, can be controlled by an evaluation and control device 6. Via the changeover switching elements 4, 5, different galvanic signal connections (signal branches) can be made between the signal connections of the apparatus 1 and the antenna connections AA1, . . . AA3.

The apparatus further comprises a plurality of splitter elements 7. By means of the splitter elements 7, a reception signal present at an input connection of the splitter element 7 can be distributed over a multiplicity of output connections of the splitter element 7.

The apparatus 1 further comprises amplification devices 8, wherein the amplification devices 8 amplify a reception signal present at an input connection of the amplification device 8.

The apparatus 1 further comprises a device 9 for detecting a signal level. Via a switching element 10, the device 9 can detect a signal level of a signal which is present on a signal link section, which is galvanically connected to one of the primary connections HA1, HA2, HA3.

In a first switching state of the switching element 10, for example, a signal level of a signal, which is present on a signal link section connected to the first primary connection HA1, can be detected. Accordingly, other signal levels can be detected in other switching states of the switching element 10. The device 9 for signal level detection is connected by signal and/or data transmission means to the control and evaluation device 6. This can detect, based on the acquired signal level, whether a transmitting signal of a terminal 2, 3 is being transmitted via the corresponding primary connection HA1, . . . HA3. For example, such a transmitting signal can be detected if the signal level is greater than a predetermined threshold value. A signal connection, via which a transmitting signal is being transmitted, can also be designated an actively transmitting primary connection HA1, HA2, HA3.

Depending on the number of actively transmitting primary connections HA1, . . . HA3 and depending on the signal connections linked to a terminal 2, 3, and also depending on the type of the connections assigned to a terminal 2, 3, switching states of the changeover switching elements 4, 5, can then be set in order to establish the desired signal connections between the signal and antenna connections AA1, . . . AA3.

If no actively transmitting primary connection HA1, HA2, HA3 is detected, then all primary connections HA1, . . . HA3 are connected to the first antenna connection AA1 by means of the changeover switching elements 4, 5. The galvanic connection of the primary connections HA1, . . . HA3 to the first antenna connection AA1 is established via reception signal branches, which are shown dotted in FIG. 1. For example, a signal received by the first antenna A1 is transmitted via the first antenna connection AA1 and the changeover switching element 4, which is galvanically connected to the first antenna connection AA1, to an amplifier device 8, which is connected to an output connection of the changeover switching element 4. The amplifier device 8 is used to amplify this reception signal, for example, to compensate for attenuation losses, and system and cable losses. The amplified signal is decomposed by a splitter device 7 and transmitted via further changeover switching elements 4 to each of the primary connections HA1, HA2, HA3.

The first secondary connection NA1 is galvanically connected via the changeover switching elements 4, 5 to the third antenna connection AA3. This allows a multipath reception by the second terminal 2.

If exactly one actively transmitting primary connection HA1, . . . HA3 is detected, then this actively transmitting primary connection, HA1, HA2, HA3 is connected to an antenna connection AA1, . . . AA3, wherein the non-actively-transmitting primary connections HA1, . . . HA3 are connected to one of the remaining antenna connections AA1, . . . AA3. In addition, the secondary connection NA1 is connected to one of the other remaining antenna connections AA1, AA3. If, for example, the first primary connection HA1 is detected as an actively transmitting primary connection HA1, then this primary connection HA1 can be connected to the first antenna connection AA1 via changeover switching elements 4. The first primary connection HA1 is connected to the first antenna connection AA1 via a so-called transmit/receive signal branch, which is shown in FIG. 1 as a solid line. The non-actively-transmitting primary connections, in other words the second and third primary connection HA2, HA3, can be connected to the second antenna connection AA2 via changeover switching elements 4. This connection can be effected using so-called receiving signal branches.

Furthermore, in this case, the first secondary connection NA1 can be connected to the third antenna connection AA3 via changeover switching elements 4, 5, and via a receiving signal branch.

If two actively transmitting primary connections HA1, HA2, HA3 are detected, for example, the first primary connection HA1 and the second primary connection HA2, these can each be connected to an antenna connection AA1, AA2 via correspondingly established transmitting/receiving signal branches. For example, the first primary connection HA1 can be connected via a transmitting signal branch to the first antenna connection AA1 and the second primary connection HA2 via an additional transmitting signal branch to the second antenna connection AA2. In this case, the non-actively-transmitting third primary connection HA3 can be connected to the third antenna connection AA3 via a receiving signal branch. In this case, the first secondary connection NA1 can also be connected to the third antenna connection AA3 via a receiving signal branch. This means that a multipath reception is possible for the second terminal 2.

If, however, the first and the third primary connections HA1, HA3 are detected as actively transmitting primary connections and each is connected to one antenna connection, for example, the first and the third antenna connection AA1, AA3, then neither of the secondary connections NA1, NA2 can be connected to the remaining antenna connection AA1, . . . AA3, since in that case the second primary connection HA2 is connected to this antenna connection. In this operating scenario therefore, no multipath reception of the second terminal 2 is possible.

If all primary connections HA1, ... HA3 are detected as actively transmitting primary connections HA1, ... HA3, these can each be connected to one of the antenna connections AA1, AA2, AA3 via appropriate transmitting signal branches. In this case, the secondary connections NA1, NA2 cannot be connected to an antenna connection AA1, AA2, AA3.

The other changeover switching elements 5 can occupy a predetermined switching state in a condition of failed or insufficient energy supply. In such a switching state, for example, the second secondary connection NA2 can be galvanically connected to the third antenna connection AA3. In addition, in this state the second primary connection HA2 can be galvanically connected to the second antenna connection AA2. If, for example, a power supply of the apparatus 1 fails, if the vehicle is involved in an accident, then these signal connections can be used to maintain a further transmit/receive operation of the second and third terminal 2, 3. For example, the third terminal 3 can execute a so-called eCall function, wherein, for example, a distress signal can be sent via the second secondary connection NA2 and via the third antenna A3.

The apparatus 1 further comprise resistors 11. These can be configured as resistors for the high-frequency signals to be transferred, i.e. as high-frequency resistors. These resistors 11 are each connected with one terminal to one of the signal connections and with one terminal to a reference potential, such as a ground potential. A value of the resistance 11 can be adjustable.

A terminal connected to the corresponding signal connection therefore detects the resistance as the output resistance of the corresponding signal connection. This is used to simulate an antenna characteristic resistance for the terminal 2, 3. Therefore a terminal 2, 3 connected to the corresponding signal connection detects the same output resistance as in the case of a direct connection of the corresponding signal connection to an antenna, although the latter is not directly connected to the signal connection.

The apparatus 1 further comprises devices 12 for detecting an output resistance of the antenna connections AA1, ... AA3. If the detected output resistance differs from an expected antenna resistance, or if the detected output resistance is outside a predetermined resistance range for an antenna characteristic resistance, then the evaluation and control device 6, which is connected to the devices 12 for detecting the output resistance via signalling means, can detect a faulty antenna A1, ... A3. This information can then be transmitted to a higher-level system 13.

It is also possible that the evaluation and control device 6 changes a resistance value of the resistors 11 if a non-functional antenna A1, A2, A3 has been detected. If, for example, a faulty antenna connection to the first antenna A1 is detected, for example, a short-circuit or no-load condition at the first antenna connection AA1, then a corresponding value of the resistor 11, which is connected to the first primary connection HA1, for example, a minimum resistance or a maximum resistance, can be set. Therefore, a terminal device connected to the first primary connection HA1 can detect an antenna connection which is not functioning as expected, and initiate appropriate error handling measures.

LIST OF REFERENCE NUMERALS 1 apparatus
2 second terminal
3 third terminal
4 changeover switching element
5 additional changeover switching element
6 control and evaluation device
7 splitter element
8 amplifier device
9 device for signal level detection
10 switchover element
11 resistor
12 device for sensing a resistance
13 higher-level system
HA1, HA2, HA3 primary connection
NA1, NA2 secondary connection
AA1, AA2, AA3 antenna connection
A1, A2, A3 antenna
SEV transmit/receive amplifier device
EAE terminal connection device

The invention claimed is:

1. An apparatus for transmitting signals from and to a plurality of terminals, the apparatus comprising:
a plurality of signal connections and at least two antenna connections, wherein a number of said signal connections is greater than a number of said antenna connections;
each of said plurality of signal connections being a primary connection or a secondary connection;
said primary connections being at least one primary connection for each terminal to be connected;
at least one linking element for linking each primary connection to each antenna connection via a signal link, wherein, in an event of insufficient power supply to the apparatus, at least one of said plurality of signal connections is linked to one of said at least two antenna connections;
at least one device for detecting transmitting activity to be transmitted via at least one of said antenna connections, said device being configured to detect an actively transmitting primary connection on a basis of a signal characteristic of a signal, wherein the actively transmitting primary connection is detected when a signal level of the signal is greater than a predetermined threshold, the signal being present on a signal link section that is connected to the primary connection and being a transmission signal generated by a terminal, and wherein signalling links between the signal connections and the antenna connections are established on a basis of the detected actively transmitting primary connections.

2. The apparatus according to claim 1, wherein the linking of the primary connections and the secondary connections to the antenna connections is made on a basis of a predetermined assignment rule.

3. The apparatus according to claim 1, wherein all primary connections are linked to one of the antenna connections and at least one secondary connection is linked to one of the remaining antenna connections if no actively transmitting primary connection is detected.

4. The apparatus according to claim 1, wherein an actively transmitting primary connection is linked to one of the antenna connections, wherein the remaining primary connections are linked to one of the remaining antenna connections, wherein at least one secondary connection is linked to one of the other remaining antenna connections if exactly one actively transmitting primary connection is detected.

5. The apparatus according to claim 1, wherein the actively transmitting primary connections are each linked to antenna connections which differ from one another, wherein remaining primary connections are linked to one of the other remaining antenna connections if more than one actively transmitting primary connection is detected, but not all primary connections are actively transmitting.

6. The apparatus according to claim 5, wherein a secondary connection, which is assigned to a same terminal as one of the actively transmitting primary connections, is linked to a remaining antenna connection.

7. The apparatus according to claim 1, wherein the actively transmitting primary connections are each linked to different antenna connections when all primary connections are detected as actively transmitting primary connections.

8. The apparatus according to claim 1, wherein the signal link of actively transmitting primary connections to the antenna connections is established on a basis of at least one antenna characteristic.

9. The apparatus according to claim 1, further comprising at least one resistor, said resistor being galvanically connected to a signal connection and said resistor simulating an antenna characteristic resistance.

10. The apparatus according to claim 1, further comprising at least one device for testing a functionality of an antenna which is linked to an antenna connection.

11. The apparatus according to claim 2, wherein the assignment rule is selectable based on a number of functional antennas.

12. The apparatus according to claim 1, wherein a secondary connection is a multi-path reception connection or a backup connection.

13. A method for transmitting signals from and to a multiplicity of terminals, the method comprising:

providing an apparatus according to claim 1;
detecting an actively transmitting primary connection on a basis of a signal characteristic of the signal generated by the terminal; and
establishing signaling links of the signal connections to the antenna connections on a basis of the actively transmitting primary connections detected in the detecting step.

14. The method according to claim 13, which comprises establishing the signaling links independently of apparatus-external control signals.

15. The apparatus according to claim 1, wherein the terminal that generates the transmission signal is galvanically connected to one of said primary connections.

16. The apparatus according to claim 1, wherein if there is an adequate power supply to the apparatus, a connection between one of said plurality of signal connections and one of said at least two antenna connections is interrupted.

17. The apparatus according to claim 16, wherein said at least one linking element is configured for, if there is the adequate power supply to the apparatus, interrupting the connection between the one of said plurality of signal connections and the one of said at least two antenna connections.

18. The apparatus according to claim 1, wherein said at least one linking element is configured for, in the event of insufficient power supply to the apparatus, linking at least one of said plurality of signal connections to one of said at least two antenna connections.

* * * * *